(12) United States Patent
Perlman

(10) Patent No.: US 8,828,470 B2
(45) Date of Patent: *Sep. 9, 2014

(54) STABILIZATION OF OMEGA-3 FATTY ACIDS IN OIL-WATER EMULSIONS

(71) Applicant: Perlman Consulting, LLC, Arlington, MA (US)

(72) Inventor: Daniel Perlman, Arlington, MA (US)

(73) Assignee: Perlman Consulting, LLC, Arlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,499

(22) Filed: May 31, 2013

(65) Prior Publication Data

US 2013/0266710 A1    Oct. 10, 2013

Related U.S. Application Data

(63) Continuation of application No. 12/276,447, filed on Nov. 24, 2008, which is a continuation-in-part of application No. 12/143,729, filed on Jun. 20, 2008, now abandoned.

(60) Provisional application No. 61/033,381, filed on Mar. 3, 2008.

(51) Int. Cl.
    *A23C 9/00*        (2006.01)
    *A23C 9/152*     (2006.01)
    *A23D 7/00*        (2006.01)
    *A23D 7/005*     (2006.01)

(52) U.S. Cl.
    CPC ........... *A23C 9/1528* (2013.01); *A23V 2002/00* (2013.01); *A23D 7/003* (2013.01); *A23D 7/0053* (2013.01)
    USPC ........................... 426/585; 426/580; 426/601

(58) Field of Classification Search
    USPC .......................................................... 426/565
    See application file for complete search history.

(56) References Cited

U.S. PATENT DOCUMENTS

| 5,709,888 | A | * | 1/1998 | Gil et al. ........................ 424/522 |
| 5,962,062 | A | * | 10/1999 | Carrie et al. ................... 426/585 |
| 6,159,523 | A | * | 12/2000 | Cain et al. ...................... 426/601 |
| 7,229,653 | B2 | * | 6/2007 | Sundram et al. .................. 426/2 |
| 2002/0058702 | A1 | * | 5/2002 | Wang et al. .................... 514/549 |
| 2005/0214409 | A1 | * | 9/2005 | Tossavainen et al. ........... 426/34 |
| 2006/0068076 | A1 | * | 3/2006 | Bertholet et al. ............. 426/601 |

FOREIGN PATENT DOCUMENTS

WO    WO 03/056939 A1 *   7/2003     ............... A23L 1/30

* cited by examiner

*Primary Examiner* — Humera Sheikh
*Assistant Examiner* — Jeffrey Mornhinweg
(74) *Attorney, Agent, or Firm* — McLane, Graf, Raulerson & Middleton, PA

(57) ABSTRACT

A food or beverage composition suitable for human consumption includes an aqueous suspension such as cow's milk that has been supplemented and homogenized with an omega-3 fatty acid-containing supplementation oil, in which a supplementation oil includes one part by weight of an EPA/DHA fatty acid-containing enriching oil that has been combined and diluted with at least one part by weight of an oxidative stabilization oil, such as a low linoleic acid/high oleic acid-containing oxidative stabilization oil. As a result, the rate of oxidation of EPA/DHA fatty acids added to the aqueous suspension via the supplementation oil can be reduced at least two-fold or even much more compared to the rate of oxidation of an equal quantity of the same EPA/DHA fatty acid-containing enriching oil homogenized into the same aqueous suspension without having been first combined and diluted with the oxidative stabilization oil.

20 Claims, No Drawings

STABILIZATION OF OMEGA-3 FATTY ACIDS IN OIL-WATER EMULSIONS

RELATED APPLICATIONS

This application is a continuation of U.S. Ser. No. 12/276,447, filed Nov. 24, 2008, which is a continuation-in-part of U.S. application Ser. No. 12/143,729, filed Jun. 20, 2008, which claims the benefit of U.S. Provisional Appl. 61/033,381, filed Mar. 3, 2008, all of which are incorporated herein by reference in their entireties.

FIELD OF THE INVENTION

The present invention relates to foods and beverages containing aqueous suspensions such as cow's milk that has been supplemented with fish oil using compositions and methods that prevent the food or beverage from developing a fishy flavor.

BACKGROUND OF THE INVENTION

The following discussion is provided solely to assist the understanding of the reader, and does not constitute an admission that any of the information discussed or references cited constitute prior art to the present invention.

Throughout the world, cow's milk has become a nearly universal part of the human diet, particularly for growing children and young adults. Milk provides high quality protein in the form of casein and whey, as well as minerals such as calcium, carbohydrate in the form of lactose, vitamins, and varying amounts of fat depending upon whether a consumer purchases full fat milk containing 4% milkfat, or alternatively reduced fat milk containing either 2% or 1% milkfat. For individuals who need to limit their intake of fat and cholesterol, fat free or skim milk is available, containing, only a trace amount of milkfat (also known as butterfat). Milk is used to produce a variety of other food products including creams, a wide variety of cheeses including cottage cheese, as well as cultured yogurt, buttermilk, sour cream, ice cream, and many other dairy products.

Milk Chemistry

Milk is an emulsion of butterfat globules within a water-based fluid. Each fat globule is surrounded by a membrane-like layer containing phospholipids and proteins. These membrane components keep the individual fat globules from joining together into larger particles of butterfat and also protect the globules from lipase enzymes found in the fluid portion of the milk. In non-homogenized cow's milk, the diameter of fat globules averages about four microns. The fat-soluble vitamins, A, D, E and K are found within the milkfat portion of the milk.

The most prevalent structures in the fluid portion of the milk are casein protein micellar aggregates whose structure also involves very small particles of calcium phosphate. Each micelle is roughly spherical and is about a tenth of a micrometer in diameter. There are four different types of casein proteins, and collectively they constitute approximately 80 percent of the protein in milk, by weight. Most of the casein is bound in micelles. It is generally agreed that outermost layer consists of strands of one type of protein, kappa-casein, extending out from the body of the micelle into the surrounding fluid. These molecules have a negative electrical charge and repel each other, keeping the micelles separated under normal conditions and in a stable colloidal suspension.

Both the fat globules and the smaller casein micelles, which are just large enough to deflect light, contribute to the opaque white color of milk. The native fat globules generally contain some yellow-orange carotene that may impart a creamy hue to a glass of milk. Fat-free skim milk on the other hand, contains only the smaller casein micelles to scatter light, and they tend to scatter shorter-wavelength blue light more than red, giving skim milk a bluish tint.

Milk contains dozens of other types of proteins besides the caseins. They are more water-soluble than the caseins and do not form actual structures in the milk like the caseins. Because these proteins remain dispersed in the whey if casein proteins are induced to coagulate into curds, they are collectively known as whey proteins. Whey proteins including lactoglobulin make up around twenty percent of the protein in milk, by weight.

Upon standing for 12 to 24 hours, fresh milk has a tendency to separate into a high-fat cream layer on top of a larger, low-fat milk layer. The separation of the cream from the milk is usually accomplished rapidly in centrifugal cream separators. With non-homogenized milk, the fat globules rise to the top of a container of milk because fat is less dense than water. The larger the fat globules, the faster the cream separates.

With regard to homogenization, milk is homogenized to prevent the cream layer from separating out of the milk. The milk is typically pumped at high pressures through very narrow tubes, breaking up the fat globules through turbulence and high shear. As the fat globules are broken into many smaller particles that possess more total surface area, the original fat globule membranes cannot re-form. The abundant small casein micelles are attracted to the newly-exposed surfaces of these smaller fat particles. Association with the casein micelles increases the density of the smaller fat globules and interferes with their clustering that would otherwise accelerate cream separation. Immediate pasteurization inactivates endogenous lipase enzymes that would otherwise attack the newly exposed surfaces of the smaller fat globules produced during homogenization. It is interesting to note that unlike pasteurization, homogenization confers no health or safety benefits to the milk, only the convenience of not needing to shake the bottle to distribute milkfat.

Omega-3 Fatty Acids.

Omega-3 fatty acids constitute a family of polyunsaturated fatty acids that are recognized as providing a wide range of health benefits when consumed as a regular part of the human diet. The most well known omega-3 fatty acids include alpha-linolenic acid (ALA) that is found in soybean oil, canola oil and flaxseed oil, as well as docosahexaenoic acid (DHA), and eicosapentaenoic (EPA) commonly found in fish oil and other marine oils. All of these fatty acids contain multiple carbon-carbon double bonds including one double bond in the omega-3 or third position inward from the distal end of the fatty acid chain that is attached at its opposite end by an ester linkage to the glycerol backbone of the triglyceride molecule.

While the human body is not capable of synthesizing omega-3 fatty acids from other nutrients, it is able to convert some of the dietary alpha-linolenic acid that is 18 carbons in length, to the longer 20 and 22 carbon chain EPA (20:5 n-3) and DHA (22:6 n-3) molecules. Both the omega-3 fatty acids and the omega-6 fatty acid, linoleic acid (18:2n-6), are termed "essential nutrients" because they are largely obtained from foods rather than synthesized by the body.

In recent years, the U.S. FDA allowed a "qualified health claim" to be made with regard to the dietary consumption of EPA and DHA, stating that "supportive but not conclusive research shows that consumption of EPA and DHA omega-3 fatty acids may reduce the risk of coronary heart disease."

A variety of medical conditions have been reported to be ameliorated by regular dietary consumption of EPA and DHA. Some of these conditions include improvement in blood circulation, control of heart arrhythmias, beneficial control of clot formation, reduction in blood pressure, beneficial reduction of blood triglyceride levels, reduced risk of primary and secondary heart attacks, and improvements covering wide range of inflammatory diseases including rheumatoid arthritis. Some research has suggested that fish oil may limit the risk of thrombotic and ischemic stroke as well, while beneficially reducing the amount of LDL cholesterol oxidation that occurs in the bloodstream and that may contribute to atherogenesis.

Some studies indicate that the incidence of certain forms of cancer including prostate, breast and colon is reduced by substantial dietary intake of omega-3 fatty acids. Still other research has suggested that omega-3 fatty acids may ameliorate conditions of psychological depression and anxiety.

While maximum safe levels of EPA and DHA have not been established, it is believed that daily intake of 4 grams EPA and 2 grams DHA are not excessive. Since many typical fish oils contain approximately 30% by weight EPA+DHA, it is likely that consuming up to 20 grams per day of fish oil would result in no adverse health effects. Many people consume between one and six 1 g capsules of fish oil per day, providing between approximately 300-1800 mg of EPA and DHA. While these levels may be desirable goals for many health-conscious individuals, it is believed that making even a fraction of these levels available to the general public by supplementing conventional foods will result in a significant public health benefit.

SUMMARY OF THE INVENTION

It has been found that dietary consumption of omega-3 fatty acids is desirable in order to provide certain health benefits. Advantageously, such omega-3 fatty acids can be provided in milk and other food products which contain substantial oil-water emulsions (or other suspensions with oil droplets in a generally aqueous environment) due to the widespread use of such products in the diet. However, such omega-3 supplementation in food products such as milk has been problematic because the omega-3 fatty acids have been relatively unstable in the milk and other products, so that fishy or other off-flavors often develop before the end of an acceptable shelf-life. This problem is particularly acute for very low fat milks, e.g., skim or non-fat milk.

The present invention provides a solution to the stability problems which have been encountered when oil-water (oil in water) suspension food products, e.g., non-fat milk, is supplemented with fish oil or other oil high in omega-3 fatty acids, by using an oil in the product in which the omega-3 fatty acids (and other polyunsaturated fatty acids) are diluted so that the oxidation rate of those fatty acids is reduced, preferably sufficiently reduced to provide a significantly increased product life. In most cases, this is accomplished by diluting the omega-3 fatty acids or oils high in such omega-3 fatty acids in an oxidative stabilization oil prior to blending (e.g., homogenizing) the oils in the milk or other food product or product component. Creation of the artificial blend of omega-3 fatty acid-containing oil and an oxidative stabilization oil is itself counterintuitive, because for common prior uses of omega-3 fatty acid-containing oils, e.g., as food supplements or nutraceuticals, it would be undesirable on both an effective concentration basis and on a transport cost basis to dilute the omega-3 oil in a bulk oil. Discovery of the effectiveness of the approach using a blend of an omega-3 fatty acid-rich oil with an oxidative stabilization oil further led to the realization that particular types of single oils and other oil blends could also be used to provide omega-3 fatty acid supplementation in milk and other oil-water products.

Thus, a first aspect of the invention concerns a food or beverage composition suitable for human consumption (e.g., a liquid milk such as cow's milk) which includes an aqueous phase that has been supplemented and homogenized with an omega-3 fatty acid-containing supplementation oil, where the supplementation oil contains docosahexaenoic acid (DHA) and/or eicosapentaenoic (EPA) fatty acids, highly preferably at a combined level sufficient to provide at least 10 mg of DHA plus EPA per 8 ounces of the aqueous suspension (e.g., milk), or of the food or beverage composition. In many cases, the supplementation oil contains one part by weight of an enriching oil containing DHA and/or EPA, that has been combined and diluted with at least one part by weight of an oxidative stabilization oil.

In particular embodiments, the rate of oxidation of the DHA and EPA fatty acids is reduced to no more than 0.80, 0.70, 0.50, 0.30, 0.20, 0.10, 0.05, 0.02, 0.01, or 0.005 of the rate of oxidation of an equal quantity of the EPA/DHA fatty acid-containing enriching oil homogenized or otherwise blended in droplet (preferably microdroplet) form into the aqueous suspension (e.g., cow's milk) without having been first combined and diluted with the oxidative stabilization oil, or reduced to within a range which is defined by taking any two different just specified values as the endpoints of the range; the rate of oxidation of the EPA/DHA fatty acids added per normal serving (e.g., 8 ounce serving of the milk) via the supplementation oil is reduced between 2- and 400-fold, 2 and 100-fold, 4- and 400-fold, 4- and 200-fold, 4- and 100-fold, 4- and 50-fold, 6- and 400-fold, 6- and 200-fold, 6- and 100-fold, 6- and 50-fold, 10- and 400-fold, 10- and 200-fold, 10- and 100-fold, 10- and 50-fold, 50- and 400-fold, or 100- and 400-fold, or even more compared to the rate of oxidation of the same quantity of the EPA/DHA fatty acid-containing enriching oil homogenized into the aqueous suspension without having been first combined and diluted with the oxidative stabilization oil.

In certain embodiments, the oxidative stabilization oil contains no more than 20, 15, 12, 11, 10, 9, or 8% by weight of polyunsaturated fatty acids, or specifically of linoleic acid; the oxidative stabilization oil contains at least 60, 65, 70, 75, 80, or 85% of monounsaturated fatty acids and/or saturated fatty acids; the oxidative stabilization oil contains at least 60, 65, 70, 75, 80, or 85% of oleic acid; the oxidative stabilization oil contains no more than 20, 15, 12, 11, 10, 9, or 8% by weight of polyunsaturated fatty acids, or specifically of linoleic acid and at least 60, 65, 70, 75, 80, or 85% of monounsaturated fatty acids (e.g., contains the specified percentage of oleic acid); the oxidative stabilization oil is a low linoleic acid and high oleic acid oil (commonly a vegetable oil), e.g., a low linoleic acid and high oleic acid sunflower seed oil; the oxidative stabilization oil is high oleic vegetable oil, e.g., high oleic sunflower oil, high oleic safflower oil, high oleic canola oil, and/or high oleic soybean oil; the oxidative stabilization oil is corn oil, sunflower oil, safflower oil, soybean oil, cottonseed oil, canola oil, peanut oil, palm fat, coconut fat, cocoa butter, palm oil, palm olein, palm kernel oil, milkfat, and/or animal fat; the oxidative stabilization oil contains no more than 15, 12, 11, 10, 9, 8, 7, 6, 5, 4, 3, 2, or 1% by weight ALA and/or no more than 2, 1.5, 1, 0.7, 0.5, 0.2, or 0.1% EPA+ DHA; the oxidative stabilization oil satisfies the ALA and/or EPA+DHA levels just specified and also satisfies any of the limitations specified for an oxidative stabilization oil as specified in this paragraph or otherwise specified herein.

Also in certain embodiments, the EPA/DHA fatty acid-containing enriching oil includes at least 15, 20, 25, 30, 35, 40, 45, 50, 55, or 60% (or even higher) by weight of the long chain polyunsaturated fatty acids EPA, DHA, and combinations thereof, or contains EPA, DHA, or a combination thereof in a range of between 15 and 60%, 20 and 60%, 25 and 60%, 30 and 60%, or 40 and 60%; the EPA/DHA fatty acid-containing enriching oil is or includes fish oil; the EPA/DHA fatty acid-containing enriching oil is or includes algae oil; the structural isomeric arrangement of EPA and/or DHA fatty acids contained within the triglyceride molecules of said EPA/DHA fatty acid-containing enriching oil have not been altered from their native structural arrangement; the EPA and/or DHA fatty acids contained within the triglyceride molecules of said EPA/DHA fatty acid-containing enriching oil have been interesterified, and the average number of said EPA and/or DHA fatty acids per triglyceride molecule has been increased.

In particular embodiments, one part by weight of an EPA/DHA fatty acid-containing enriching oil has been combined and diluted with approximately 2, 3, 4, 5, 7, 10, 12, 15, 17, or 20 parts by weight of an oxidative stabilization oil, e.g. a low linoleic acid/high oleic acid-containing oxidative stabilization oil, or with between 2 and 5 parts, 2 and 10 parts, 2 and 20 parts, 5 and 10 parts, 5 and 20 parts, 10 and 15 parts or 10 and 20 parts by weight of an oxidative stabilization oil.

For some embodiments, between 5 and 500 mg, 10 and 200 mg, 10 and 100 mg, 50 and 500 mg, 50 and 200 mg, 50 and 100 mg, 100 and 500 mg, or 100 and 200 mg of EPA or DHA fatty acids or a combination of both are added per 8 ounce serving of the milk.

In certain embodiments in which there are separate oil and water phases (e.g., as an emulsion) in the composition (e.g., a milk or milk-containing product), the oil phase includes at least one oil soluble and water insoluble antioxidant, highly preferably at a concentration effective to provide significant antioxidant protection to unsaturated fatty acids (and especially to polyunsaturated fatty acids, including omega-3 fatty acids) in that oil phase. Such antioxidants may, for example, include BHA and/or BHT (e.g., at levels up to 100 ppm by weight of either or each) and/or ascorbyl palmitate (also referred to as vitamin C palmitate, e.g., at levels of up 1000 ppm by weight).

Thus, in particular embodiments, the oil phase includes 10 to 100, 20 to 100, or 50 to 100 ppm of BHA and/or BHT, and/or 20 to 1000, 50 to 1000, 100 to 1000, 50 to 500, 100 to 500, 200 to 700, or 200 to 500 ppm ascorbyl palmitate; the oil phase includes effective amounts of at least two, three, or four different approved oil soluble/water insoluble antioxidants; the oil phase includes at least a 3, 4, 5, 7, 10, 15, or 20-fold dilution of an omega-3 fatty acid enriching oil in an oxidative stabilization oil and at least one oil soluble/water insoluble antioxidant, preferably effective to reduce the oxidation rate of polyunsaturated fatty acids to no more than 0.9, 0.8, 0.7, 0.5, 0.3, 0.2, or 0.1 of the rate in the absence of the antioxidant(s); the oil phase includes vitamin E (e.g., at a level of 200 to 2000 ppm by weight or even higher) and at least one other oil soluble/water insoluble antioxidant, e.g., an antioxidant(s) as described for other embodiments herein.

In further embodiments, the composition is or includes cow's milk, which can, for example, be skim milk (non-fat milk), 1% reduced fat milk, 2% reduced fat milk, or whole milk; the cow's milk or the composition is incorporated into another cow's milk-containing dairy product, e.g., hard cheese, cottage cheese, cream cheese, yogurt, fresh cream, sour cream, buttermilk, ice cream, a mixed dairy beverage, or butter.

In particular embodiments, the supplementation oil is a single oil or an oil blend which contains EPA and/or DHA at levels such that the combination of the two is no more than 20% by weight of that oil, and preferably no more than 17, 15, 12, 10, 8, 7, 6, or 5% by weight of the supplementation oil and/or the supplementation oil contains ALA, preferably at a level of no more than 30% by weight, or more preferably at a level of no more than 25, 20, 15, or 10% by weight; such supplementation oil may, for example be a blend of an omega-3 fatty acid-enriching oil and an oxidative stabilization oil, a blend of two more oils of which none by itself is an oxidative stabilization oil, or a single oil selected or designed to provide the desired omega-3 fatty acid levels. In particular embodiments, the levels of other polyunsaturated fatty acids or specifically of linoleic acid in the supplementation oil is limited, e.g., such that the non-omega-3 polyunsaturated fatty acids or specifically linoleic acid constitute no more than 20, 15, 12, 11, 10, 9, 8, 7, 6, 5, or 4% by weight of the supplementation oil, and/or the supplementation oil contains at least 30, 40, 50, 60, 65, 70, 75, 80, or 85% by weight of oleic acid or combination of monounsaturated fatty acids or at least 30, 40, 50, 60, 65, 70, 75, 80, or 85% by weight of oleic acid or combination of monounsaturated fatty acids and 3 to 25, 5 to 25, 10 to 25, 3 to 15, 3 to 10, 5 to 15, or 5 to 10% by weight of saturated fatty acids (preferably where the monounsaturated fatty acid to saturated fatty acid ratio is at least 1.5, 2, 3, 5, 7, or 10.

In particular embodiments, the product is a milk, milk-containing or milk-derived composition, a cream, cream-containing, or cream-derived composition, a cream cheese, a processed cheese, a natural cheese, a sour cream, a yogurt, a coffee creamer, an ice cream, a refrigerated or non-refrigerated dip, a salad dressing (including both spoonable and pourable salad dressings), a mayonnaise, a popcorn shortening, a "smoothie" beverage, or a processed egg or egg substitute.

Similarly, in a related aspect, the invention concerns a food or beverage composition suitable for human consumption that includes an aqueous suspension (e.g., cow's milk) that has been supplemented and blended (e.g., homogenized) with an omega-3 fatty acid-containing supplementation oil, where the supplementation oil includes one part by weight of an alpha-linolenic fatty acid-containing enriching oil, that has been combined and diluted with at least one part by weight of an oxidative stabilization oil.

In particular embodiments, the reduction of the rate of oxidation, the type and/or amount of oxidative stabilization oil, the ratio of the enriching oil and the stabilization oil, the type of milk and/or composition are as described for embodiments of the preceding aspect.

In certain embodiments, the alpha-linolenic fatty acid-containing enriching oil is flaxseed oil.

A related aspect concerns a blended omega-3 fatty acid-containing supplementation oil, which includes an omega-3 fatty acid-rich oil artificially blended as an artificial mixture with an oxidative stabilization oil, e.g., in a ratio of 1 part omega-3-rich oil and at least two parts of the oxidative stabilization oil.

In particular embodiments, the omega-3 fatty acid-containing supplementation oil, the omega-3-containing oil (i.e., omega-3 rich oil), and the oxidative stabilization oil are as specified for other aspects herein.

Additional related aspects concern a method for making a blended omega-3 fatty acid-containing supplementation oil and a method for making a stabilized, omega-3 supplemented aqueous suspension (e.g., liquid milk). The method for making a blended omega-3 fatty acid-containing supplementation oil involves artificially blending one part by weight of an enriching oil containing at least one omega-3 fatty acid, e.g., docosahexaenoic acid (DHA) or eicosapentaenoic (EPA) fatty acids or both, and/or alpha linolenic acid (ALA) with at least one part by weight of an oxidative stabilization oil, thereby forming an omega-3 fatty acid-containing supplementation oil. The method for making a stabilized, omega-3 supplemented aqueous suspension (e.g., liquid milk) involves blending (e.g., homogenizing) a quantity of an omega-3 fatty acid-containing supplementation oil (e.g., as prepared by the preceding method) with an aqueous suspension such as cow's milk (commonly a skim milk), thereby forming a stabilized, omega-3 supplemented aqueous suspension (e.g., liquid milk), usually containing from 0.05% to 7% by weight of fats and oils.

In particular embodiments, the resulting milk or other aqueous suspension, the enriching oil, and/or the oxidative stabilization oil are as described for an omega-3 supplemented aqueous suspension (e.g., liquid milk) for other aspects herein.

Additional embodiments will be apparent from the Detailed Description and from the claims.

DETAILED DESCRIPTION OF THE PREFERRED EMBODIMENTS

In recent years, the medical community has become increasingly aware of the importance of consuming omega-3 fatty acids as a regular part of the human diet. The addition of fish oil, algae oil, and/or flaxseed oil as omega-3 enriching oils to cow's milk and other edible aqueous suspensions can help ensure that young people in particular will regularly consume omega-3 fatty acids. However, a difficulty with such additions has been that the fish oils or other omega-3 fatty acid-containing oils can relatively rapidly develop a disagreeably fishy odor/flavor due to degradation products. This problem is particularly difficult in products such as skim milk and 1% milk products, but can also occur with 2% and whole milk and other food products containing higher levels of fats and oils. In the skim and 1% milks, the omega-3 fatty acids appear to be especially exposed to oxidation, with the result that off-flavors develop excessively rapidly.

Therefore, the present invention concerns the stabilization of omega-3 fatty acids in aqueous suspensions such as skim milk and 1% milk, but is also applicable to 2% and whole milks, as well as to other foods containing such milks or other aqueous suspensions. The invention optimizes the compositions and methods involved in adding omega-3 fatty acids to aqueous suspensions such as milk so that the chemical stability of omega-3 fatty acids is maintained. This helps ensure that the flavor of the enriched food product will not be unacceptably compromised by oxidation of omega-3 fatty acids.

Because milk forms a common component of the diet of many individuals and because rapid rancidity of milks supplemented with omega-3 fatty acid is readily detectable and highly objectionable to most individuals, the present invention will primarily be described and illustrated in the context of milk products. However, it should be understood that the invention concerns essentially any oil:water suspension (which is often emulsified).

Production of Omega-3 Supplemented Milks

Current production of homogenized milk involves several manufacturing steps that are relevant to the process of supplementing milk with omega-3 enriching oils, including flaxseed oil and/or fish oil, which are the current principal sources of omega-3 fatty acids. Whole milk arriving from a dairy farm is normally processed through a cream separator that produces separate streams of skim milk and cream. By this means, any source of cow's milk can be processed using a single protocol that provides skim milk that is subsequently modified by adding varying amounts of milkfat, minerals, e.g., added calcium, fortifying vitamins, optional milk solids, flavorings, e.g., chocolate, and the like.

In a simple milk production operation, skim milk, vitamins A and D, and appropriate amounts of cream are metered into a mixing tank. In the context of the present invention, fish oil may also be metered (often separately) into the mixing tank along with the milk. After thorough mixing, the blended milk is sent through a homogenizer and pasteurizer that emulsify the fat into very small, stable fat globules or microdroplets in the milk as described above. The milk is also heated to a sufficient temperature and for a sufficient time to kill most of the microorganisms in the milk. With so-called UHT pasteurization, the milk is rendered essentially sterile for extended shelf life, allowing the milk to be stored for some time without refrigeration, or under refrigerated conditions with a shelf life of several weeks following production.

Omega-3-Associated Off-Flavors in Milk

As indicated above, in response to the growing awareness that omega-3 fatty acids can provide substantial health benefits to humans of all ages, a number of dairies have begun to supplement conventional cow's milk products with flaxseed oil, providing alpha-linolenic acid (ALA) and/or fish oil (providing EPA and DHA). It has been observed that off-flavor development in such omega-3-supplemented milks can occur, and sometimes (e.g., during the summer season) it is a regular problem during the shipping and storage of these milks. Off-flavor development has been characterized as a somewhat "fishy" flavor, or other unexpected flavor. Such off-flavors are reported more frequently with skim milk and 1% milks than with higher milkfat-content products.

Indeed, the oxidative stability problem of fish oil in milk has been recognized for years, and only limited progress has been made in solving this essential problem that involves complex chemistry.

For example, Antrim et al., in U.S. Pat. No. 4,963,385, describe the addition of sugar, sugar alcohols and metal ion chelators to aqueous food emulsions containing a fish oil to help prevent rancidity.

Further, Akahoshi et al., in U.S. Pat. No. 6,025,008 describe yogurt in which certain sweet substances including certain sugars and starches in combination with refined fish oil can be packed in an oxygen-blocking hermetic package and prevent fishy odors from developing.

However, with regard to oxidative rancidity occurring in an aqueous emulsion system such as milk, Applicant points out in U.S. Pat. No. 7,344,747 (from U.S. patent application Ser. No. 10/834,518) that "the oxygen addition reaction with conjugated dienes that are produced during omega-3 oxidation is a second order reaction that accelerates directly as a function of dissolved oxygen concentration. There are numerous patents that teach the use of aqueous vehicles rather than oils for formulating and storing omega-3s. However, water can be expected to accelerate hydrolytic rancidity compared to oil, so that overall, water would be a grossly inferior environment for maintaining the integrity of any triglyceride molecule."

In fact, oxidative rancidity development involves many variables, and the factors that affect the rate of omega-3 fatty acid oxidation in food emulsions are numerous and interdependent. Consequently, there is often no substitute for empirical observation, and experimentation by trial and error to find acceptable or optimal conditions for reducing or preventing omega-3 enriching oils such as fish oils from developing off-flavors.

It is believed that the amount of fishy flavor development that occurs in fish oil-supplemented milks depends upon shipping and storage temperatures and the time spent in the grocery cooler prior to purchase and dietary consumption. Some of these variables are difficult to control. It appears that off-flavor development associated with fish oil and other omega-3 source enrichments is most pronounced in skim milk, less pronounced in reduced fat milk, and least problematic in full fat milk. It would be highly desirable to modify some aspect of the chemistry of omega-3 supplemented milk, or modify the physical or chemical environment within the milk storage container to prevent off-flavor development associated with omega-3 supplementation.

Another variable involves the amount of fish oil being added to an 8 ounce serving of milk. One typical level employed in the present invention is approximately 100 mg of fish oil per 250 gm serving of milk, providing approximately 32 mg of EPA and DHA. In principle, milkfat that contains only 3% by weight of endogenous polyunsaturates (linoleic+ alpha-linolenic acids) could provide an ideal vehicle for stabilizing added omega-3 fatty acids in milk if a mechanism similar to that discovered by Applicant for stabilizing the ALA in flaxseed oil (see U.S. Pat. No. 7,344,747) were operative.

Adding Omega-3 Fatty Acids to Milk Versus Peanut Butter

In issued U.S. Pat. No. 7,344,747 (issued from U.S. patent application Ser. No. 10/834,518), flaxseed oil was diluted into the endogenous peanut oil expressed during the grinding of specially selected low-linoleic acid content peanuts while making peanut butter. The rate of oxidation and development of flaxseed oil rancidity was diminished by using these low linoleic acid content peanuts whose endogenous oil contained approximately 8% linoleic acid rather than regular peanuts whose oil contained approximately 32% linoleic acid. That peanut butter/peanut oil system differs significantly from the present milk system in several fundamental ways. For example, peanut butter is a non-aqueous system in which an ALA omega-3 rich oil (e.g., flaxseed oil) is dissolved and diluted directly into peanut oil that constitutes approximately 50% of the peanut butter product. By contrast, milk is an aqueous protein emulsion system containing a relatively low level of fat (milkfat) that is emulsified within an aqueous phase (typically 0.2%-4% by weight). It is difficult if not impossible to extrapolate between these two distinctly different systems with regard to the stability of an exogenously added omega-3 enriching oil.

Because the differences between the chemistry of the aqueous protein emulsion of milk and the non-aqueous peanut butter, it was impossible to predict whether or how omega-3 fatty acids in milk could be stabilized. Therefore, Applicant analyzed the homogenization and pasteurization process in milk. It was unexpectedly discovered that when fish oil and milkfat (in the form of cream) are blended into skim milk and then homogenized, a substantial portion, if not most of the fish oil fails to physically and chemically mix with the milkfat in the cream. To the contrary, the homogenization process has been found to produce separate microdroplets of milkfat and fish oil that are each apparently surrounded by casein micellar proteins before they have an opportunity to co-mingle. As a consequence, at the molecular level, the fish oil and milkfat components remain largely separate. Therefore, instead of the fish oil becoming diluted by the milkfat, it remains essentially pure.

Once this finding was made, Applicant realized that the opportunity for the omega-3 fatty acids to be stabilized against oxidative rancidity by dilution with milkfat had been lost. That is, milkfat indeed contains only 3% by weight polyunsaturated fatty acids. However, because the milkfat and fish oil surprisingly fail to mix during homogenization, this oxidative stabilization of the fish oil by a fat that contains a very low level of polyunsaturated fatty acids fails to occur.

Solution for Omega-3-Associated Off-Flavor Development in Milk

Cow's milk, which is an important exemplary aqueous emulsion of the present invention, typically contains less than 4% edible fat, with the principal milk products being non-fat milk (less than 0.2% milkfat), reduced fat milks (approximately 1% and 2%), and whole milk (approximately 3.5-4.0%). Thus, these milks, and especially the non-fat milk and 1% reduced fat milk, present the difficult problem posed by omega-3 supplementation because of the degradative reactions of omega-3 fatty acids.

Initially, in view of Applicant's work as described in U.S. Pat. No. 7,344,747, Applicant believed it likely that by co-homogenizing at least two parts by weight milkfat with one part by weight fish oil, the fats would combine and the rate of oxidation or rancidification of the omega-3 fatty acids should diminish, e.g., by as much as 9-fold. That is because the rate of fatty acid peroxidation is thought to vary directly with the square of the concentration of carbon-carbon double bonds present in an edible fat or oil.

Therefore, with one part by weight fish oil and two parts by weight milkfat, the fish oil's omega-3 fatty acids were expected to be diluted 3-fold by the milkfat, resulting in as much as a 9-fold decrease in the bimolecular second order rate of omega-3 oxidation. Even employing a reduced fat milk containing only 1% milkfat, an 8 ounce serving of this milk would contain 2.5 g (2500 mg) milkfat, and by adding only 100 mg fish oil, the omega-3s in the fish oil were expected to be diluted an additional 25-fold and would be substantially stabilized against oxidation. However, this expectation turned out to be false because, as explained above, co-homogenizing the fish oil with the milk did not result in mixing and dilution of the fish oil with milkfat.

As a remedy for the above problem, Applicant discovered that instead of adding the individual fat components to milk and co-homogenizing (i.e., adding the omega-3-enriching fish oil and milkfat/cream to milk as described above), it was necessary to pre-dissolve the unstable omega-3-fatty acid-containing fish oil in an "oxidative stabilization oil," i.e., a carrier fat or oil such as an oxidation-resistant vegetable oil, prior to homogenization. In that manner, the very small microglobules of fat formed in the milk during homogenization would contain omega-3 fatty acids already diluted with a fat or oil resistant to oxidative rancidity. The carrier oil used is advantageously substantially more resistant to oxidation than the omega-3 fatty acid-containing oil. Preferably, the carrier oil (that acts as a chemical diluent for the omega-3 fatty acid enriching oil, e.g., fish oil) is an oil high in monounsaturated and/or saturated fatty acids and low in polyunsaturated fatty acids (e.g., preferably no more than about 20% polyunsaturated fatty acids). It is especially preferable that the carrier oil is low in linoleic acid. Particularly preferably as the carrier oil is a high-oleic, low-linoleic fat or vegetable oil. One example of such a carrier oil is high oleic/low linoleic acid sunflower oil (e.g., Clear Valley Sunflower Oil or Odyssey 100 Sunflower Oil sold by Cargill, Inc. (Minneapolis, Minn.) containing 10% saturated fatty acids, 82% by weight monounsaturated oleic acid and only 8% linoleic acid. Despite these preferences, a variety of different oils and oil blends may be used which have substantially greater oxidative stability as compared to omega-3 fatty acid-containing oils.

As explained above, it is preferable to pre-dissolve one part by weight of an omega-3-enriching fish oil (e.g., EPA/DHA enriching oil) in at least two parts by weight of an oxidative stabilization oil to achieve at least a 3-fold dilution of the omega-3 fatty acids relative to their original concentration in the enriching oil. In theory, a 3-fold dilution of the omega-3 fatty acids could reduce the rate of omega-3 oxidation up to 9-fold. Of course, lower dilutions can be used, with corresponding lower levels of omega-3 fatty acid stabilization expected.

Therefore, to provide a 3-fold dilution, if 100 mg of fish oil is to be added as a supplement to a serving of milk, it can first be diluted with at least 200 mg of oxidative stabilization oil such as the low linoleic/high oleic-containing sunflower oil described above. Greater dilutions of the omega-3-enriching oil are even more preferred, with, for example, 300-500 mg sunflower oil being used as the oxidative stabilization oil for 100 mg of fish oil to provide a four to six-fold dilution rather than a 3-fold dilution of the EPA/DHA enriching oil.

The resulting mixture or blend of omega-3 enriching oil and omega-3 stabilization oil (i.e., an oxidative stabilization oil) that is added and homogenized in cow's milk or other aqueous suspension may be conveniently referred to as an "omega-3 fatty acid-containing supplementation oil", or simply as a "supplementation oil", or with added reference to the based aqueous suspension, e.g., a "milk supplementation oil."

Though the low linoleic/high oleic oil is preferred for the oxidative stabilization oil, other fats and/or oils may be used, e.g., cocoa butter, conventional palm oil, palm olein, palm superolein, and palm kernel oil (the palm oil and derivatives being low linoleic (e.g., about 9-11%)/high saturated fat oils), as well as conventional canola oil, soybean oil, cottonseed oil, corn oil, sunflower oil, milk fat, and/or safflower oil, as well as combinations of such oils.

In forming the blend of omega-3 enriching oil and omega-3 oxidative stabilization oil, in many cases, a single stabilization oil will be used. However, as indicated above, more than one oil may be used in combination as an oxidative stabilization oil. Such a combination will often be formed by mixing more than one oil to form the oxidative stabilization oil, before blending with the omega-3 enriching oil. However, the blend may also be formed by combining more than one oil, which together act as an oxidative stabilization oil, with the omega-3 enriching oil without premixing or with only partial premixing of the components of the oxidative stabilization oil. In many embodiments, the various oil components of the oxidative stabilization oil will each be oxidative stabilization oils, but alternatively, one or more of those component oils will not be oxidative stabilization oils alone, but the combination is an oxidative stabilization oil.

Inclusion of Antioxidants in Oil Phase of Dairy Products

As an approach to enhance the oxidative stabilization effects of dilution of omega-3 fatty acid-containing oils by dilution in an oxidative stabilization oil, or as an alternative to that approach, fat/oil soluble, water insoluble antioxidants can be included in the dairy products, and especially in aqueous emulsion type products such as liquid milks. In this approach, at least one antioxidant is blended with an omega-3 fatty acid-containing edible oil, or with an oxidative stabilization oil which is simultaneously or subsequently mixed with an omega-3 fatty acid-containing oil.

Using antioxidants to protect omega-3 fatty acids and other polyunsaturated fatty acids against oxidation in milks and similar products involves selection of appropriate antioxidants. The antioxidants should be fat/oil soluble, water insoluble antioxidants, or be antioxidants which can be used at sufficiently high concentrations and having sufficiently low solubility in water so that the residual antioxidant concentration in the oil phase of the milk is still sufficiently high so as to provide effective antioxidant protection. A number of antioxidant compounds are commonly used in foods. These include, for example, TBHQ, BHA, and BHT.

Tert-butylhydroquinone (TBHQ), also identified as 2-(1,1-Dimethylethyl)-1,4-benzenediol, is used as a food preservative, including as an antioxidant in edible oils. It is currently regarded as the most effective antioxidant for such oils and is stated to be effective in foods (e.g., fried foods) prepared using such oils. Nonetheless, TBHQ is less desirable for use as an antioxidant in the present milks and similar products because it has appreciable water solubility. As a result, even if initially present in the oil phase of the emulsion, it will rapidly partition between the oil and aqueous phases. Due to the much greater volume of the aqueous phase as compared to the oil phase in milks and similar aqueous suspensions, a substantial fraction or even most of the TBHQ will partition in to the aqueous phase and will not be effective to protect the omega-3 fatty acids (or other polyunsaturated fatty acids) from oxidation.

On the other hand, BHA (butylated hydroxyanisole) and BHT (butylated hydroxytoluene) have sufficiently sparing solubility in water that only a small amount of these compounds will partition from the oil phase to the water phase in milk. As a result, inclusion of one or both of these compounds in an oil preparation as indicated above, which is then mixed and homogenized with a milk or other aqueous phase, will provide effective oxidation protection.

Vitamin E (e.g., as D-alpha-tocopherol or D,L-alpha tocopherol) can also be added, and can serve as an antioxidant for the oils in a milk product, or other oil:water suspension. Vitamin E can also be added to milk as a dietary supplement (most often in the form of D- or D,L-alpha-tocopheryl acetate), e.g., at levels of about 0.01 to 0.02% by weight of the milk or other aqueous suspension. For use as an antioxidant for the oil in milk or other such aqueous suspension, an active form (e.g., free tocopherol) is added to the oil, in many cases at a level of about 100 to 5000 ppm or more commonly about 200 to 2000 ppm in the oil, e.g., about 200 to 500, 300 to 700, 500 to 1000, 700 to 1500, or 1000 to 2000 ppm. Other isomers of tocopherol can also be used as alternatives or in addition, such as beta-tocopherol, gamma-tocopherol, delta-tocopherol, and combinations thereof.

Additional Approach for Providing Stabilized Omega-3 Fatty Acids in Milk

As described above, the present invention is concerned with providing milk products and other food products containing oil:water suspensions supplemented with omega-3 fatty acids (e.g., from fish oils or flaxseed oil) in a manner such that oxidation of the omega-3 fatty acids is significantly reduced. As described above, this can advantageously be accomplished by blending an omega-3 fatty acid-enriching oil with an oxidative stabilization oil. The discovery that such blending is effective also leads to the alternative approach of focusing on the final fatty acid composition of the supplementation oil. Thus, the supplementation oil may be formed by blending an omega-3 fatty acid-rich oil with an oxidative stabilization oil, but alternatively the supplementation oil may be formed by blending a plurality of oils which individually are not omega-3 fatty acid-rich oils and/or are not oxidative stabilization oils resulting in a blended oil having the desired balance of omega-3 fatty acids with stabilizing fatty acids such as monounsaturated and/or saturated fatty acids, and preferably without an excess of non-omega-3 polyunsaturated fatty acids such as linoleic acid. In still another alternative, a single oil may be selected or designed having an acceptable balance of fatty acids, such as a selected or designed algal oil.

DEFINITIONS

To assist the understanding of the reader, in discussing the present invention and in the claims, the following terms are applicable and have the indicated meanings.

The term "food or beverage composition" within the context of the present invention refers to any edible includes an aqueous suspension (e.g., cow's milk) in any measurable amount.

The term "aqueous suspension" refers to a suspension of one or more species in water. Such species may include, for example, proteins and/or oils. In many but not all cases, such an "aqueous suspension" will be an "emulsion". Thus, the term "stabilized omega-3 aqueous suspension" refers to an aqueous medium (such as skim milk) into which has been added or emulsified an omega-3 supplementation oil (e.g., to produce a homogenized filled milk). A filled milk is skim milk that has been reconstituted with fats from sources other than dairy cows. solid, liquid or gel composition suitable for human consumption that The term "supplemented and homogenized" refers to the addition to any aqueous suspension, e.g., cow's milk, with high shear mixing or other effective blending method, by which an edible oil (or traditionally cream) is uniformly and stably dispersed into the milk so that the edible oil (in the form of micro-droplets) does not substantially separate from the bulk of the aqueous suspension and float to the top. Such separation would be undesirable in the same manner that cream separation that occurs in non-homogenized cow's milk is undesirable. Generally there will be no substantial separation over the normal shelf life for the resulting product.

The terms "EPA/DHA fatty acid-containing enriching oil" and "EPA/DHA fatty acid-containing oil" refers to any edible oil that is predominantly triglyceride-based and contains an abundance of the omega-3 fatty acids, EPA and/or DHA. The term "abundance" as used herein means that the edible oil contains at least a total of 10% by weight EPA+DHA fatty acids, and preferably 20-35% or even 35-60%, or higher EPA+DHA fatty acids.

The terms "alpha-linolenic fatty acid-containing enriching oil" and "alpha-linolenic acid-containing oil" refer to any edible oil that is predominantly triglyceride-based and contains an abundance of the omega-3 fatty acid, alpha-linolenic acid (abbreviated ALA). The term "abundance" when used with ALA means that the edible oil contains at least 25% by weight ALA and preferably 35% by weight or more ALA.

Similarly, the terms "omega-3 enriching oil" and "omega-3 fatty acid-containing enriching oil" and like terms refer to an edible oil that is either or both of an "EPA/DHA fatty acid-containing enriching oil" or an "alpha-linolenic fatty acid-containing enriching oil".

Further distinguishing the present omega-3 fatty acid-containing supplementation oils from conventional cooking and salad oils is that a substantial proportion of the triglyceride molecules in the supplementation oils contain two, and sometimes three, omega-3 fatty acids esterified within the same triglyceride molecule. Thus, for the three glycerol carbon positions within omega-3-containing triglyceride molecules found in the supplementation oils, often the sn-1 and sn-2, or the sn-2 and sn-3, or the sn-1 and sn-3 positions are esterified with omega-3 fatty acids.

The terms "omega-3 fatty acid-containing supplementation oil", "supplementation oil", and like terms such as those containing reference to an aqueous suspension or oil-water suspension (e.g., "omega-3 fatty acid-containing milk supplementation oil") are used to refer to an edible oil composition that includes omega-3 fatty acids along with other fatty acids in proportions such that the rate of oxidation of the omega-3 fatty acids is significantly reduced as compared to the rate of oxidation of the omega-3 fatty acids in a conventional cod liver oil containing at least 30% by weight of a combination EPA and DHA. Such oxidation rate is determined for oils (or oil-containing milk product) held at 4 degrees C. with air exposure of at least 50 $cm^2$ per liter. The significant reduction is a statistically significant reduction, preferably such that the rate of oxidation in the supplementation oil is not more than 0.80, 0.70, 0.50, 0.30, 0.20, 0.10, 0.05, 0.02, 0.01, or 0.005 of the rate in the cod liver oil. In many advantageous cases, the supplementation oil is a blended oil composition, i.e., a mixture of edible oils, that includes:

(a) an omega-3 fatty acid-containing enriching oil ((providing EPA and/or DHA and/or ALA, see above) that is susceptible to oxidation and, that is combined and diluted with (b) a triglyceride-based edible oil that possesses good oxidative stability compared to the oxidative stability of oils high in omega-3 fatty acids. Preferably such oil is low in polyunsaturated fatty acids (especially linoleic acid) and high in monounsaturated (e.g., oleic) and/or saturated fatty acids. Preferred examples of the edible oil having good oxidative stability can be referred to as "oxidative stabilization oils", such as low linoleic/high oleic sunflower oil.

Thus, the term "oxidative stabilization oil" refers to a triglyceride-based edible oil that is substantially more resistant to oxidation than EPA/DHA fatty acid-containing enriching oils. Such oxidative stabilization oil preferably contains less than 20% and more preferably less than 17% 15%, 12%, 11%, 10%, 9%, or 8% by weight polyunsaturated fatty acids or specifically linoleic acid. Preferably such oxidative stabilization oil also contains more than 65% and preferably more than 70%, 75%, or 80% by weight monounsaturated and/or saturated fatty acids. In desirable embodiments, the oxidative stabilization oil is a high oleic acid oil. Thus for example. high oleic sunflower oil sold as Clear Valley® High Oleic Sunflower Oil or Odyssey® 100 High Stability Sunflower Oil produced by Cargill, Inc. (Minneapolis, Minn.) contains only 8% linoleic acid, 8% palmitic+stearic saturated fatty acids, and 82% monounsaturated oleic acid. Advantageously, oxidative stabilization oils preferably contain no more than 15% by weight linolenic acid (generally as ALA) and more preferably no more than 12, 11, 10, 9, 8, 7, 6, 5, 4, 3, 2, or 1% by weight, and/or no more than 2% EPA+DHA, and more preferably no more than 1.5, 1, 0.7, 0.5, 0.2, or 0.1%.

The effectiveness of the oxidative stabilization oil in stabilizing omega-3 fatty acids in the supplementation oil is evident because the rate of oxidation of at least 10 mg of EPA and DHA fatty acids added to an 8 ounce serving of milk is reduced at least two-fold compared to the rate of oxidation of an equal quantity of the same EPA and DHA fatty acid-containing enriching oil that is homogenized into the same cow's milk without having been first combined and diluted with the oxidative stabilization oil.

The terms "whole milk," "reduced fat milk" and "skim milk" have their standard meanings, with whole milk containing approximately 4% milkfat and reduced fat milks containing either approximately 2% or 1% by weight milkfat, while skim milk contains no added milkfat but may contain up to 0.5 g fat per 8 oz. serving (0.2% by weight fat).

The term "fish oil" is discussed elsewhere herein. Fish oil is refined from the tissues of many varieties of oily fish such as mackerel, sardines and herring. Fish oil commonly contains between 20% and 30% by weight of a combination of EPA and DHA long chain polyunsaturated fatty acids. The fish do not actually produce omega-3 fatty acids, but instead accumulate them by consuming microalgae (also termed "algae" herein) that produce these fatty acids or other organisms which have accumulated those fatty acids. Marine microalgae, or phytoplankton, provide the food base for the entire sea animal population. The best known microalgae are the diatoms, dinoflagellates, green algae and blue-green algae. These microalgae species produce a wide range of lipid fatty acids including significant quantities of the essential polyunsaturated fatty acids, linoleic acid, alpha-linolenic acid and the highly polyunsaturated omega-3 fatty acids, octadecatetraenoic acid (C18:4), eicosapentaenoic acid (C20:5) and docosahexaenoic acid (C22:6).

Thus, the term "algae oil" refers to an oil obtained from lipid-producing microorganisms, including for example, diatoms, dinoflagellates, green algae, and/or blue-green algae. Commonly such algae oil is obtained from green algae.

The term "interesterified" used within the context of an EPA and DHA fatty acid enriching oil refers to the optional use of enzymatic or chemical cleavage of these fatty acids from the natural triglyceride molecule, followed by esterification, by which the average number of EPA and/or DHA fatty acids esterified (attached by an ester linkage) per fat molecule may be increased. Fish oils so altered by interesterification may contain upward of 50% by weight EPA/DHA.

The term "high oleic" as used herein refers to edible oils containing at least 65% and preferably at least 70%, 75%, or 80% by weight of the monounsaturated fatty acid, oleic acid. Plant breeding has allowed the genetic selection of a variety of high oleic vegetable oil species including but not limited to sunflower oil, safflower oil, canola oil, and soybean oil.

The term "rate of oxidation" in the context of oxidation of EPA and DHA fatty acids within an edible oil that is added to cow's milk according to the methods described herein, refers to the rate of accumulation of by-products from fatty acid oxidation including acids, aldehydes, and ketones, for example. These by-products are produced by peroxidation or addition of oxygen atoms to the fatty acids contained within fish oil triglyceride molecules. The accumulation of such oxidative by-products may be measured by a variety of methods known to those skilled in the art, including, for example, organoleptic evaluation methods by which rancidity in a milk sample becomes detectable by taste and/or smell and chemical, as well as chemical analytical methods.

As used herein in connection with edible oils, the term "artificial mixture" refers to a mixture or blend created by a person or persons of two or more oils from different sources and having different characteristics. Similarly, the terms "artificially blending" and "artificially mixing" refer to a blending carried out by a person or persons.

In reference to inclusion of antioxidant compounds to oils and especially to the use of such oils in milks, milk-containing products, and other aqueous suspensions and foods containing such aqueous suspensions, the term "effective amount" or an indication that the antioxidant(s) are "effective" means that the antioxidant(s) significantly reduce the rate of oxidation of polyunsaturated fatty acids or particularly of omega-3 fatty acids in the oil as compared to the rate of oxidation with conditions the same except for the absence of the antioxidant(s). Advantageously, in some cases the rate of oxidation is reduced to no more than 95, 93, 90, 80, 70, 60, 50, 40, 30, 20, or 10% of the oxidation rate in the absence of the antioxidant(s).

In connection with the use of antioxidants in the present invention, the term "fat soluble/water insoluble" means that the particular antioxidant compound has a vegetable oil/water partition coefficient at 4 degrees C. (based on an approximately average canola oil) of at least 20, but preferably at least 25, 50, 100, 200, 300, 500, 700, or 1000. In this context, the partition coefficient is the ratio of the concentration of the solute in the vegetable oil to the concentration of the solute in the water at equilibrium ($C_o/C_w$)

Also in the context of the use of antioxidants in the present invention, the term "fat soluble" indicates that the antioxidant is sufficiently soluble in a present supplementation oil at 4 degrees C. to effectively reduce the rate of oxidation of polyunsaturated fatty acids in that oil, and/or to have a solubility in average canola oil at 4 degrees C. of at least 50, and preferably at least 100 ppm by weight. In some cases, the solubility will be greater, e.g., at least 200, 500, 700 or 1000 ppm.

In reference to a particular type of vegetable oil, the term "average" means that the components (primarily the particular fatty acids) of the oil have median values based on a large number of independent geographically and temporally diverse samples of the specified oil.

In reference to food products, the term "normal serving" refers to the quantity of that food product which matches FDA requirements for serving size definitions for nutritional labeling purposes, e.g., based on FDA-established lists of "Reference Amounts Customarily Consumed Per Eating Occasion." If the serving size is not defined by such FDA requirements, then the serving size is the amount of that food customarily eaten at one time based on consumer data. In reference to an edible aqueous suspension which is not itself the food product in question, unless indicated to the contrary in the context of a particular food product which incorporates the aqueous suspension the term "normal serving" refers to the quantity of the aqueous suspension incorporated in a "normal serving" of that food product.

Further embodiments of the present invention are provided below.

EXAMPLES

Example 1

Example of Stabilized Omega-3 Supplemented Milk

Preparation Method for Pilot Production Tests with Fish Oil-Supplemented Milk

Standardized milks, i.e., milks adjusted to the standards of identity for skim, 1% or 2% reduced fat milks, or whole milk respectively were prepared, adding non-fat milk solids (adding either non-fat condensed milk or non-fat powdered milk) and cream if required for adjusting fat content. Typical non-fat condensed milk contained approximately 33% non-fat milk solids. Standardized milks containing the required butterfat and non-fat milk solids content were added into a 1200 gallon tank with a wide sweep agitator.

Separate from the milk, a suitable amount of fish oil (e.g., either cod liver oil or menhaden oil containing between 30% and 50% by weight EPA and DHA) was mixed and diluted with an oxidative stabilization oil such as high oleic sunflower oil containing approximately 82% oleic acid, 8% linoleic acid and 8% saturated fatty acids (obtained from Cargill, Inc. Minneapolis, Minn.).

Approximately 250 gallons of the standardized milk was transferred to a high speed blender. With the agitator running in the blender, half the oil mixture was added to the blender. Vitamins (vitamin A palmitate, vitamin D3 and D,L-alpha-tocopheryl acetate) required for the batch along with any other required ingredients (e.g., sugar, cocoa, carageenan, vanilla and salt for chocolate milk) were added to the blender, and the blender was allowed to run an additional 15 seconds.

This operation was repeated for the remainder of the batch, and the blended product was returned to the 1200 gallon tank and allowed to recirculate for one minute. The finished 1200 gallon batch was transferred to a raw holding tank and the next batch commenced. Generally, four or more 1200 gallon milk batches were prepared and transferred to the raw holding tank before homogenization and ultra-pasteurization were carried out.

Milk Stability Tests

Stability Problem.

Nutritionally enhanced varieties of milk were prepared containing increased levels of calcium and protein (via added milk solids) as well as fortifying levels of vitamin E and omega-3 fatty acid-rich fish oil. Such enhanced milk products were subjected to ultra-pasteurization with the expectation of providing milks having a code life (saleable shelf life) of 77 days.

Initial commercial milk formulations were manufactured with 4.3 pounds of cod liver fish oil being homogenized per 10,000 pounds of milk. This milk contained 0.043% fish oil that provided approximately 32 mg of EPA plus DHA per 8 oz serving of milk and was returned by consumers complaining about fishy flavor as soon as 45 days following manufacture. These complaints were more common with skim milk products as compared to the 1% reduced fat milk and full fat milk. More generally, complaints of fishy flavor were reported within one to two months following manufacture. This was deemed unsatisfactory since the expiration code required that these milks maintain satisfactory taste for at least 77 days (2.5 months) following manufacture.

Modifications to the milk that is most susceptible to off-flavor development, i.e., the skim milk formula and lactose-reduced skim milk, were initiated with the hope of improving the robustness of the formula against rancidity, to allow the product to reliably last the entire coded period under normal storage and usage conditions without consumer complaints.

Use of Fish Oil Dilution.

As described elsewhere herein, Applicant discovered that the resistance of fish oil to becoming rancid in milk, and the resulting increase in the shelf life of fish oil-fortified milk products might be accomplished by pre-combining and diluting the fish oil into a rancidity-resistant vegetable oil such as a high oleic acid content vegetable oil. Because milk production trials are very expensive and wasteful, two stability tests were adopted.

Accordingly, 0.2% by weight (0.48 g per serving) of a high oleic content vegetable oil (sunflower oil containing 82% oleic acid, 8% linoleic acid and 8% saturated fatty acids) was pre-combined with 0.043% by weight of fish oil (0.103 g per serving) thereby diluting the fish oil 5.7-fold before adding into regular skim milk. As an experimental control, a skim milk formulation containing the same type and amount of fish oil (0.043% cod liver oil containing approximately 31% by weight EPA+DHA and providing about 32 mg EPA+DHA per serving) but lacking the high oleic content vegetable oil was also produced. Bottled milk samples were held at refrigerated temperature (3 degrees C.) to assess normal refrigerated shelf life during the marked code life of the milk.

Whereas the refrigerated control skim milk (with undiluted fish oil) showed flavor degradation within 45 days, the skim milk with pre-diluted fish oil showed no flavor degradation even after 80 days at 3 degrees C. Products were also evaluated for taste after these refrigerated milks were diluted ten-fold into hot water at 90 degrees C. to reflect the effect of hot tea or coffee on the milk. Similar results were obtained, and confirmed the efficacy of pre-diluting a fish oil into a stabilizing oil or fat before homogenizing with milk.

Samples of the above skim milk products were also held at elevated temperature (30 degrees C.) for accelerated stability testing, and sampled daily for off-flavor development. Skim milk that contained the undiluted fish oil (i.e., without any high oleic content sunflower stabilizer oil for diluting the fish oil) showed rapid flavor degradation during incubation at 30 degrees C., turning fishy and rancid within 3 to 4 days. By contrast, the same skim milk containing the sunflower oil-diluted fish oil showed no flavor degradation before 11 days of incubation at 30 degrees C. In addition, similarly incubated 1% milkfat-containing regular and lactose-free milks containing the same amount of diluted fish oil (0.043% fish oil and 0.2% high oleic sunflower oil) showed no flavor degradation even after 12 days of incubation.

Second, multi-variant trials were initiated on a Microthermics, pilot size milk processor to evaluate a number of possible changes in the milk formulation. A variety of milk samples stored in both sealed as well as open bottles (milk exposed to air) were evaluated daily for flavor deviation at elevated temperature (30 degrees C.). All milks contained the above-described 0.1 g per serving of fish oil diluted with 0.5 g per serving of high oleic content vegetable oil. Control samples were run along with the test samples.

Results Summary.

The milk production samples evaluated to date showed the following results:

Skim milk samples were produced containing the same above-described fish oil diluted with the same amount of high oleic sunflower oil as described above. From three different production runs, the milk (stored at 30 degrees C. for accelerated stability testing) lasted at least 10.5, 12, and 12 days before either showing rancidity or exhausting the samples available for tasting (see table below). From previous tests it was known that skim milks without pre-dilution of the fish oil lasted only 3-4 days at 30 degrees C. before tasting fishy. This represents a three to four-fold improvement in resistance to rancidity development as a function of time, owing to the pre-dilution of the fish oil with the stabilizing sunflower oil.

Lactose-Free skim milk samples containing fish oil and oxidative stabilization oil from one production run were similarly prepared and evaluated for 12.5 days at elevated temperature with no flavor deviation noted (all samples evaluated).

Milks containing 1% butterfat from two production runs were similarly prepared and evaluated during 10 and 12 days storage at elevated temperature (30 degrees C.) with no rancidity deviation noted in any of the samples tasted (all samples evaluated).

Evaluation of identical refrigerated samples (3 degrees C.) showed that all products lasted over 60 days with no rancidity noted.

| Product | Code | Days to Fail at 30 degrees C. | Days to Fail at 3 degrees C. |
| --- | --- | --- | --- |
| Skim | May 19 | 11 | >70 |
| Skim | May 19 | >10* | >70 |
| 1% | May 20 | >10* | >70 |
| Lactose Free | May 28 | >12.5* | >70 |
| Skim | May 28 | >12* | >70 |
| 1% | May 29 | >12* | >70 |

*exhausted sample before rancidity failure
Skim milks with 0.1 g/serving undiluted fish oil showed rancidity before 5 days at 30 degrees C.

Pilot samples are run using the same production settings as used with full scale production. Further experiments are being conducted to optimize the dilution ratio of high oleic content vegetable oil to fish oil in order to determine the minimum effective ratio for achieving flavor stability at 3 degrees C. over further extended time intervals beyond 60 days, e.g., 80-100 days. For example, ratios in excess of 4:1 dilutions, e.g., 5:1, 7:1 and 10:1 are being tested. In addition, edible oils other than high oleic vegetable oil are being tested such as palm oil, palm olein, palm stearin, palm kernel oil, milkfat, cocoa butter, corn oil, canola oil, safflower oil, sunflower oil, cottonseed oil, and soybean oil for example.

Example 2

Examples of Food Compositions Incorporating Stabilized Omega-3 Oils

The following example recipes illustrate additional foods incorporating omega-3 supplementation oils. Composition percentages are given as weight percentages. As will be readily understood, many variants of these foods can also be made by varying the ingredient list and/or ingredient amounts.

| Mayonnaise (Serving Size 15 g) | |
|---|---|
| Ingredients | Percent (%) |
| Water | 52.6008 |
| High Oleic (HO) Sunflower Oil | 30.215 |
| -Omega-3 Oil | 0.2133 |
| Starch | 5.0221 |
| Vinegar | 5.4866 |
| Salt | 1.1752 |
| Sugar | 2.4106 |
| Whey Protein Concentrate | 2.0000 |
| Mustard Flour | 0.5173 |
| Sodium Benzoate | 0.0854 |
| Potassium Sorbate | 0.0854 |
| Xanthan Gum | 00753 |
| Beta Carotene | 0.0251 |
| Celery Salt | 0.0412 |
| Citric Acid | 0.0251 |
| Vitamin E | 0.0141 |
| EDTA | 0.0075 |
| Total | 100.0000 |

| Salad Dressing- Creamy Italian (Serving Size 80 g) | |
|---|---|
| Ingredients | Percent (%) |
| Water | 36.8043 |
| HO Sunflower Oil | 29.6223 |
| -Omega-3 Oil | 0.0400 |
| Vinegar | 12.4965 |
| Sugar | 9.6317 |
| Starch | 5.0705 |
| Egg Yolks, 10% salt | 4.0235 |
| Salt | 0.9274 |
| Minced Onion | 0.6064 |
| Garlic Powder | 0.4994 |
| Potassium Powder | 0.0852 |
| Peppers | 0.1284 |
| Oregano | 0.0571 |
| Calcium Disodium EDTA | 0.0073 |
| Total | 100.0000 |

| Cheese Sauce (Macaroni and Cheese) Serving Size 100 g | |
|---|---|
| Ingredients | Percent (%) |
| Milk | 69.04 |
| Cheddar Cheese | 24.36 |
| HO Sunflower Oil | 2.97 |
| -Omega-3 Oil | 0.03 |
| Starch | 2.40 |
| Salt | 1.00 |
| Lecithin | 0.20 |
| Total | 100.00 |

| Sour Cream- (Serving size 30 g) | |
|---|---|
| Ingredients | Percent (%) |
| Whole Milk | 70.0000 |
| Heavy Cream | 16.0000 |
| Skim Milk | 5.0000 |
| Non-Fat Dry Milk | 4.0000 |
| Starch | 2.2200 |
| Lactic Acid | 1.0000 |
| HO Sunflower Oil | 0.4433 |
| -Omega-3 Oil | 0.1067 |
| Guar Gum | 0.3500 |
| Salt | 0.3000 |
| Sodium Tripolyphosphate | 0.2500 |
| Locust Bean Gum | 0.2500 |
| Sodium Citrate | 0.0800 |
| Total | 100.0000 |

| Yogurt (Serving Size 225 g) | |
|---|---|
| Ingredients | Percent (%) |
| Water | 80.2900 |
| Protein | 7.4100 |
| Sugar | 5.5000 |
| Fructose | 2.0000 |
| Stabilizer | 2.2500 |
| HO Sunflower Oil | 1.2358 |
| -Omega-3 Oil | 0.0142 |

-continued

| Yogurt (Serving Size 225 g) | |
|---|---|
| Ingredients | Percent (%) |
| Dextrose | 1.0000 |
| Natural Masking Flavor | 0.3000 |
| Total | 100.0000 |

Other Exemplary Products for Inclusion of Omega-3 Supplementation Oils:
Cream Cheese—Low Fat/Regular
½ & ½ Creamers
Ice Cream—Low Fat
Smoothie
Cheese
Dips
Sauces
Gravy
Batters and dough All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, variations can be made in the particular choice of oxidative stabilization oil, source of EPA/DHA or alpha-linolenic fatty acid-containing enriching oils, method of combining and diluting edible oils, method of homogenizing and/or pasteurizing milk, method of measuring and reporting the fat content of milk, method of measuring the rate of oxidation of omega-3 fatty acids in milk and the like. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A beverage composition comprising:
   (a) a nonfat milk or reduced fat milk; and
   (b) a blended omega-3 fatty acid supplementation oil comprising:
      (i) one part by weight of an enriching oil containing an omega-3 fatty acid selected from the group consisting of docosahexaenoic acid (DHA), eicosapentaenoic acid (EPA), alpha-linolenic acid (ALA), and combinations thereof; and
      (ii) between 2 and 20 parts by weight of an oxidative stabilization oil selected from the group consisting of palm kernel oil, coconut oil, cocoa butter, and combinations thereof;
   wherein said supplementation oil contains no more than 11% by weight of linoleic acid.

2. The beverage composition of claim 1 that contains 0.5% or less total fat.

3. The beverage composition of claim 1 that contains about 1% total fat.

4. The beverage composition of claim 1 that contains about 2% total fat.

5. The beverage composition of claim 1 that contains between 5 and 500 mg of omega-3 fatty acids per 8 ounces of the beverage composition.

6. The beverage composition of claim 1 that contains between 5 and 500 mg of DHA or EPA or ALA or any combination of DHA, EPA, and/or ALA per 8 ounces of said beverage composition.

7. The beverage composition of claim 1, wherein the enriching oil comprises fish oil, algae oil, flaxseed oil, or any combination thereof.

8. The beverage composition of claim 1 that is lactose free.

9. The beverage composition of claim 1 further comprising at least one oil soluble or water soluble antioxidant.

10. The beverage composition of claim 1 that is substantially free of rancidity for greater than 70 days when stored at 3° C.

11. A processed food or beverage product comprising or made from the beverage composition of claim 1.

12. The processed food or beverage product of claim 11 that is cream, hard cheese, cottage cheese, cream cheese, processed cheese, natural cheese, cheese sauce, sour cream, yogurt, coffee creamer, ice cream, a refrigerated or non-refrigerated dip, salad dressing, mayonnaise, a smoothie beverage, a processed egg, an egg substitute, buttermilk, ice cream, a mixed dairy beverage, or butter.

13. A method of making a beverage composition, the method comprising the steps of:
   (a) blending one part by weight of an enriching oil that contains omega-3 fatty acids with between 2 and 20 parts by weight of an oxidative stabilization oil selected from the group consisting of palm kernel oil, coconut oil, cocoa butter, and combinations thereof, thereby forming a supplementation oil, wherein said supplementation oil contains no more than 11% by weight of linoleic acid; and
   (b) homogenizing the supplementation oil with a nonfat milk or reduced fat milk to produce a beverage composition.

14. The method of claim 13, wherein the omega-3 fatty acids are selected from the group consisting of DHA, EPA, ALA, and any combination thereof.

15. The method of claim 13, wherein the enriching oil comprises fish oil, algae oil, flaxseed oil, or any combination thereof.

16. The method of claim 13, further comprising adding to the beverage composition at least one water soluble or oil soluble antioxidant.

17. The beverage composition of claim 1, wherein the supplementation oil consists of:
   (i) one part by weight of an enriching oil containing an omega-3 fatty acid selected from the group consisting of docosahexaenoic acid (DHA), eicosapentaenoic acid (EPA), alpha-linolenic acid (ALA), and combinations thereof; and
   (ii) between 2 and 20 parts by weight of an oxidative stabilization oil selected from the group consisting of palm kernel oil, coconut oil, cocoa butter, and combinations thereof.

18. The beverage composition of claim 1, wherein said supplementation oil contains no more than 9% by weight of linoleic acid.

19. The beverage composition of claim 1, wherein said supplementation oil contains no more than 7% by weight of linoleic acid.

20. The beverage composition of claim 1, wherein the supplementation oil further comprises a high-oleic, low linoleic fat or vegetable oil.

* * * * *